United States Patent [19]

Obrestad et al.

[11] Patent Number: 5,472,530
[45] Date of Patent: Dec. 5, 1995

[54] METHOD OF MANUFACTURING FREE-FLOWING AMMONIUM NITRATE PARTICLES APPLYING AN ANTICAKING AGENT

[75] Inventors: Torstein Obrestad, Ulefoss; Leif G. Hellebø, Øvre Årdal; Jan B. Isaksen, Porsgrunn; Bjørn Juliussen, Skien, all of Norway

[73] Assignee: Norsk Hydro a.s, Oslo, Norway

[21] Appl. No.: 360,789

[22] PCT Filed: Jun. 30, 1993

[86] PCT No.: PCT/NO93/00105

§ 371 Date: Feb. 24, 1995

§ 102(e) Date: Feb. 24, 1995

[87] PCT Pub. No.: WO94/01366

PCT Pub. Date: Jan. 20, 1994

[30] Foreign Application Priority Data

Jul. 3, 1992 [NO] Norway .................................. 922628

[51] Int. Cl.⁶ ........................... C06B 45/30; C06B 31/28; A01N 25/00; C05G 5/00

[52] U.S. Cl. ................ 149/5; 149/46; 423/267; 428/403; 427/215; 71/59; 71/64.12

[58] Field of Search ............... 149/5, 46; 423/267; 428/403; 427/215; 71/64.12, 59

[56] References Cited

U.S. PATENT DOCUMENTS 4,316,736  2/1982  Vanttijfte ..................................... 71/59

FOREIGN PATENT DOCUMENTS 3008891  8/1984  Germany .

OTHER PUBLICATIONS

Derwent Abstract of EP 95814 (AN 83-840289/50).
Derwent Abstract of JP 61291411-A (AN 87-033913/05).

Primary Examiner—Donald P. Walsh
Assistant Examiner—Anthony R. Chi
Attorney, Agent, or Firm—Wenderoth, Lind & Ponack

[57] ABSTRACT

The present invention relates to a method of manufacturing free-flowing ammonium nitrate particles, applying an inorganic coating. The invention also comprises an anti-caking coating.

8 Claims, No Drawings

METHOD OF MANUFACTURING FREE-FLOWING AMMONIUM NITRATE PARTICLES APPLYING AN ANTICAKING AGENT

The present invention relates to a method of manufacturing free-flowing ammonium nitrate particles, applying an inorganic coating. The invention also comprises a new type of anticaking coating.

Ammonium nitrate (AN) has high caking tendency, even at very low water content, i.e. the particles stick together and will no longer be free-flowing. Another problem related to ammonium nitrate is its transition from one crystal modification to another. Especially the transition from modification III-IV at about 32° C. might result in dust formation and increased caking problems. This phase transition depends to some degree on the water content of the ammonium nitrate particles.

There are known several methods for dealing with the above problems. Firstly, application of various coatings. However, if the ammonium nitrate is to be used in explosives like ANFO or emulsion explosives, the coating might cause problems for the manufacture and application of the explosive. Conventional anticaking coatings comprising amines or sulphonates with or without inert powder are examples of coatings causing problems when the coated ammonium nitrate is applied in explosives.

The phase transition at 32° C. can be prevented or reduced by adding magnesium nitrate to the AN melt prior to particulation. But this method requires that the melt is evaporated down to a water content of about 0.5 weight % before particulation to attain reasonable caking properties of the particles. Such a superevaporation is not applicable for manufacture of porous AN or crystal AN. Thus AN stabilized against phase transition will in most cases still need an anticaking coating.

In European Patent No. 95814B is described a method for producing non-caking ammonium nitrate granules. This method comprises phase stabilization by a special cooling procedure. The particles are preferably coated with an organic coating and then an inorganic powder prior to storage.

Further, it is in Japanese Patent Publication No. J61291411-A described AN particles having low caking tendency. The ammonium nitrate powder particles are blended with a zinc ammonium sulphate having less than 5 molecules of crystal water per molecule, and a metal oxide micropowder. The amount of sulphate is 0.05–1 weight % of the ammonium nitrate. Though the caking tendency is reduced by this method, the anticaking agent easily results in dust formation. The added sulphate and the metal oxide will also cause problems if the AN should be used in explosives. Especially in emulsion explosives the above applied agent would result in destabilization of the emulsion.

The main object of the present invention was to arrive at a method for producing free-flowing AN particles, especially AN crystals which could be applied in explosives like ANFO- and emulsion explosives.

The second object was to produce free-flowing AN particles without having to lower the water content of the AN solution or melt below 3–4% prior to particulation.

A further object was to attain free-flowing AN particles without using organic anticaking agents and powder like talc, kaoline, $SiO_2$ etc.

The inventors first investigated various ways of solving the problems related to crystal AN to be used in explosives. The new stabilizing or coating agent should not alter significantly the crystal structure of the AN particles and should also be compatible with the various components of the explosive. In order to avoid problems during crystallization it was decided to look for a new coating and not add chemicals like crystal modifiers to the AN solution prior to crystallization or particulation. In view of the fact that free water present in the AN particles increases the possibility for phase transition and caking, the inventors tried to find a coating agent which would bind free water present and/or prevent the AN particles from absorbing water from the surroundings, i.e. moisture from the air during storage. Known inorganic agents like talc or zinc ammonium sulphate could to some degree reduce the amount of free water present, but application of such agents was excluded in view of the dust problems and lack of compatibility with the explosives. It was then surprisingly found that application of salts which themselves have high caking tendency could produce free-flowing AN particles. This could be obtained by spraying the AN particles with aqueous solutions of the salts and then drying to the extent that the amount of free water present corresponded to that which could be bound as crystal water of said salts. This procedure resulted in a coating that adhered to the AN particles and nil dust formation was observed. This approach to the problem was further elaborated and various salt solutions were tested on both crystal AN particles and prilled or granulated particles. The latter type of particles could also be phase stabilized by addition of MgO or $Mg(NO_3)_2$ to the AN melt or solution prior to particulation. The above investigations showed that aqueous solutions of inorganic salts, forming salt hydrates with at least one molecule crystal water could be applied. Especially solutions of magnesium- or calcium nitrate were found to give stable coatings which made the AN particles free-flowing. Thus coated AN particles could also be applied in explosives, even emulsion explosives, without causing any problems like destabilization.

The scope of the invention is as defined in the attached claims.

The invention is further explained and shown in the following examples.

EXAMPLE 1

This example shows production of AN crystals using the same technique as for prilled AN for obtaining stabilized AN. To concentrated AN solutions varying amounts of magnesium nitrate were added and the solutions were cooled below 10° C. Then AN crystals containing magnesium nitrate were precipitated. The crystals were dried in fluid bed at about 50° C. and analyzed with regard to water content and caking tendency. The AN crystals from these tests contained 0.1–0.6 weight % magnesium nitrate, depending to some degree on the amounts of magnesium nitrate added to the AN solution before cooling. All of these crystals had high caking tendency.

Mol $Mg(NO_3)_2$/mol AN varied from 1/7 to 1/12.

The following conclusions could be drawn from this example:

a) It is most difficult to control the magnesium nitrate content of the AN crystals when magnesium nitrate is added to an AN solution.

b) The system AN-$Mg(NO_3)_2$-$H_2O$ binds the water rather strongly when equilibrium has been obtained (AN-$Mg(NO_3)_2$-hydrate crystals).

EXAMPLE 2

This example shows preparation according to the invention of coated AN particles, Moist AN crystals containing 0.3–1% $H_2O$ were at 50° C. sprayed with an aqueous solution of 35–45 weight % magnesium nitrate (MgN) in amounts corresponding to 0.5–1 weight % MgN in the AN product. The solution was sprayed on a thin layer of warm AN crystals on a conveyor belt. Subsequent to spraying the crystals were transferred to a drying drum where the crystals were dried at a product temperature of 70°–80° C. The crystals were then cooled down to about 25° C. and analyzed with regard to water content and caking tendency. AN crystals without any additives and AN crystals conditioned with sulphonate containing anticaking agent were used as reference.

The different AN crystal products were stored for 1 month in 25 kg paper bags and subjected to various storage pressures. The results of these storage tests are shown in Table I. Caking tendency ranked from 1–6 is given for the products at storage pressures varying from 0.0–0.5 kg/cm². The ratio mol $H_2O$/mol $Mg(NO_3)_2$, stated as $H_2O$/MgN, is also given for the various products. The products according to the invention are sprayed with a MgN solution in amounts corresponding to 0.4 and 1 weight % MgN as stated in the table for the respective test series.

TABLE I

Caking tendency for AN crystal products

| | Storage pressure in kg/cm² | | | | Mol $H_2O$/ Mol MgN |
|---|---|---|---|---|---|
| | 0 | 0.1 | 0.2 | 0.5 | |
| AN crystal product uncoated | 5.5 | 5.0 | 6.0 | 5.0 | — |
| AN crystal product with sulphonate | 2.0 | 2.5 | 3.0 | 3.5 | — |
| AN crystal product 0.4% $Mg(NO_3)_2$ | 1.0 | 2.0 | 2.5 | 2.5 | 4.2 |
| | 1.5 | 2.0 | 3.0 | 3.0 | 6.2 |
| | 1.0 | 2.0 | 3.0 | 2.5 | 4.4 |
| | 1.0 | 2.0 | 2.0 | 2.5 | 5.8 |
| | 1.5 | 2.0 | 2.5 | 3.0 | 7.7 |
| | 1.5 | 1.0 | 1.5 | 1.5 | 4.2 |
| An crystal product 1% $Mg(NO_3)_2$ | 1.0 | 1.5 | 1.5 | 2.0 | 4.8 |
| | 1.0 | 2.0 | 2.0 | 2.0 | 4.4 |
| | 1.0 | 1.5 | 1.5 | 1.5 | 3.9 |
| | 1.0 | 1.5 | 1.5 | 1.5 | 3.7 |

The indexes used for caking tendency is:
1.0 free-flowing
2.0 some caking
3.0 substantial caking
4.0 hard product
5.0 very hard product
6.0 hard as stone The indexes used for caking tendency is:

1.0 free-flowing 2.0 some caking 3.0 substantial caking 4.0 hard product 5.0 very hard product 6.0 hard as stone Examples 1 and 2 show that in order to obtain excellent anticaking effects the water content of the AN particles should be reduced to a level corresponding to $Mg(NO_3)_2 \cdot 6 H_2O$ or lower.

MgN may have 2, 4, or 6 mols of crystal water.

Further tests showed that products to be stored for several months at a relatively high pressure should preferably have a water content corresponding to $Mg(NO_3)_2 \cdot 4 H_2O$ or less.

EXAMPLE 3

This example shows application of calcium nitrate (CN) instead of MgN as coating agent. CN may have 2, 3 or 4 mols of crystal water.

Batches of 5 kg each of crystal AN particles were heated to 40° C. and transferred to a rotating drum in which aqueous CN solutions were sprayed on the particles at a temperature of 70° C. Then the products were dried in a fluid bed. The various amounts and concentrations of the CN solutions sprayed on the particles are stated in Table II. These products were stored for 1 month in 2 kg paper bags at a storage pressure of 0.5 kg/cm². The water content of the dried products and the respective caking tendencies are stated in Table II.

TABLE II

| Product | % $H_2O$ | Mol $H_2O$/ Mol CN | Caking tendency |
|---|---|---|---|
| AN crystals | 0.08 | — | 5.5 |
| AN crystals + 1% CN (84% solution) | 0.20 | 1.8 | 2.0 |
| AN crystals + 1% CN (75% solution) | 0.35 | 3.2 | 2.5 |
| AN crystals + 1% CN (70% solution) | 0.20 | 1.8 | 1.5 |
| AN crystals + 1% CN (70% solution) | 0.51 | 4.6 | 3.5 |
| AN crystals + 1% CN (70% solution) | 0.12 | 1.1 | 1.0 |

This example shows that crystal AN particles coated with CN can contain far more water than uncoated particles and still have substantially lower caking tendency. The examples further show that the maximum water content of the particles should correspond to less than 4 mol water per mol CN on the particles, preferably the water content of the particles should during drying be brought down to less than 2 mol $H_2O$/mol CN as shown in Table II.

EXAMPLE 4

This example shows production according to the invention of AN prills. AN prills at a temperature of 25° C. were sprayed with a 75% aqueous MgN solution at 120° C. in a conditioning drum. The MgN solution crystallized as it got in contact with the cold AN particles and formed a solid coating on the prills. Addition of 2.6% of said solution produced AN prills having a coating of $MgN.2H_2O$/$MgN.4H_2O$ in an amount of 2 weight % of the total weight of the coated prills.

The product was tested with regard to water content and caking tendency and compared with uncoated prills.

TABLE III

| Product | % $H_2O$ | Mol $H_2O$/ Mol MgN | Caking tendency |
|---|---|---|---|
| AN prills | 0.08 | — | 5.5 |
| AN prills + 2% MgN coating | 0.49 | 2.0 | 1.0 |

This example shows that coating of AN prills with MgN dramatically improves the storage properties of AN prills.

EXAMPLE 5

This example shows caking tendencies at various storage pressures for different types of AN particles, with and without MgN coating which is applied prior to the drying step.

TABLE IV

| Product/caking tendency | Storage pressure in kg/cm² | | | | Mol H₂O/ Mol MgN |
|---|---|---|---|---|---|
| | 0 | 0.1 | 0.2 | 0.5 | |
| AN crystals uncoated | 5.5 | 5.0 | 6.0 | 5.5 | — |
| AN crystals 1% MgN coating | 1.0 | 1.0 | 1.5 | 1.5 | 3.7 |
| AN prills uncoated | 3.0 | 3.5 | 4.0 | 5.5 | — |
| AN prills 1% MgN coating | 1.0 | 1.0 | 1.5 | 2.0 | 3.9 |

The storage tests lasted for 1 month. The AN particles were stored in 25 kg bags exposed to the various pressures stated in Table IV.

This example shows that the particles coated with MgN will be substantially free-flowing even when stored at a pressure of 0.5 kg/cm² contrary to uncoated AN crystals or prills which then will be hard and almost solidified into a block of AN.

By the present invention the inventors have been able to produce free-flowing AN that can be applied directly in explosives, even emulsion explosives. The method does not require evaporation of the AN solution to more than 96–97% AN and is applicable on AN granules, prills and crystals. This implies that the expensive superevaporation will not be necessary for obtaining free-flowing particles. The method comprises application of an inorganic coating sprayed on the AN particles in the form of an aqueous solution prior to final drying. The preferred coating is magnesium- and/or calcium nitrate having less than maximum amount of hydrate water, i.e. less than 6 or 4 crystals water per molecule nitrate, respectively.

Coating of the AN particles with 0.1–3 weight % of the above nitrates has no adverse effects on the explosives they are used in contrary to conventional anticaking agents. The AN particles produced according to the invention are free-flowing even after several months of storage.

The simple manufacturing method and the versatility of the new coating agent which is applicable on all types of AN particles are advantages of great importance.

We claim:

1. Method of manufacturing free-flowing ammonium nitrate particles, comprising application of an inorganic coating, characterized in that the ammonium nitrate particles prior to final drying and storage are coated by spraying with an aqueous solution of at least one inorganic salt, forming salt hydrates with at least one molecule crystal water and that the particles are dried to a water content < the maximum amount of crystal water that can be bound by said inorganic salts.

2. Method according to claim 1, characterized in that an aqueous solution of magnesium- and/or calcium nitrate is sprayed on the ammonium nitrate particles in an amount corrsponding to 0.1–3 weight % of the coated particles.

3. Method according to claim 1, characterized in that an aqueous solution of magnesium nitrate is sprayed on the ammonium nitrate particles which then are dried to a water content < the water content in a coating of $Mg(NO_3)_2 \cdot 6H_2O$ corresponding to a ratio mol $H_2O$/mol MgN < 6.

4. Method according to claim 1, characterized in that an aqueous solution of calcium nitrate is sprayed on the ammonium nitrate particles which then are dried to a water content < the water content in a coating of $Ca(NO_3)_2 \cdot 4H_2O$ corresponding to a ratio mol $H_2O$/mol CN < 4.

5. Method according to claim 1, characterized in that the ammonium nitrate particles are ammonium nitrate crystals.

6. Coated ammonium nitrate particles, characterized in that the coating comprises at least one inorganic salt having at least one mol of crystal water.

7. Coated ammonium nitrate particles according to claim 6, characterized in that the coating consists of magnesium nitrate having 2–6 mols of crystal water.

8. Coated ammonium nitrate particles according to claim 6 characterized in that the coating consists of calcium nitrate having 2–4 mols of crystal water.

* * * * *